(12) United States Patent
Zhou et al.

(10) Patent No.: US 10,698,831 B2
(45) Date of Patent: Jun. 30, 2020

(54) METHOD AND APPARATUS FOR DATA ACCESS

(71) Applicant: EMC IP Holding Company LLC, Hopkinton, MA (US)

(72) Inventors: Qiaosheng Zhou, Beijing (CN); Junping Zhao, Beijing (CN); Xinlei Xu, Beijing (CN); Wilson Hu, Beijing (CN); Jun Wu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 18 days.

(21) Appl. No.: 15/848,451

(22) Filed: Dec. 20, 2017

(65) Prior Publication Data

US 2018/0173638 A1 Jun. 21, 2018

(30) Foreign Application Priority Data

Dec. 21, 2016 (CN) ............... 2016 1 1194069

(51) Int. Cl.
*G06F 12/0891* (2016.01)
*G06F 12/122* (2016.01)
*G06F 16/00* (2019.01)
*G06F 12/126* (2016.01)
*G06F 12/128* (2016.01)
*G06F 12/123* (2016.01)

(52) U.S. Cl.
CPC ........ *G06F 12/0891* (2013.01); *G06F 12/122* (2013.01); *G06F 12/123* (2013.01); *G06F 12/126* (2013.01); *G06F 12/128* (2013.01); *G06F 16/00* (2019.01); *G06F 2212/1024* (2013.01)

(58) Field of Classification Search
CPC ............... G06F 12/0811; G06F 3/0685; G06F 12/0891; G06F 12/122; G06F 2212/1024; G06F 12/123; G06F 12/126; G06F 12/128; G06F 16/00
See application file for complete search history.

(56) References Cited

U.S. PATENT DOCUMENTS

| | | | |
|---|---|---|---|
| 4,677,550 A * | 6/1987 | Ferguson | G06F 16/9027 |
| 6,457,102 B1 | 9/2002 | Lambright et al. | |
| 7,234,021 B1 * | 6/2007 | Chilton | G06F 12/0866 711/113 |
| 9,122,589 B1 | 9/2015 | Bono et al. | |
| 9,699,263 B1 * | 7/2017 | Shats | H04L 67/2852 |
| 9,727,479 B1 | 8/2017 | Armangau et al. | |

OTHER PUBLICATIONS

Vankamamidi, et al., "Managing Data in Log-Structured Storage Systems," U.S. Appl. No. 15/966,464, filed Apr. 30, 2018.

* cited by examiner

*Primary Examiner* — Zhuo H Li

(74) *Attorney, Agent, or Firm* — BainwoodHuang

(57) ABSTRACT

Embodiments of the present disclosure relates to a method and device of data access. The method comprises determining whether target data stored in a non-volatile storage device is cached in a memory. The target data is organized in a first level of a multi-way tree in the storage device. The method further comprises, in response to determining that the target data is missing in the memory, moving the target data from the storage device into the memory. Besides, the method comprises, in response to the target data being accessed from the memory, adding a reference to the target data to a first list, the first list recording a sequence for accessing data in the first level.

22 Claims, 8 Drawing Sheets

METHOD AND APPARATUS FOR DATA ACCESS

RELATED APPLICATIONS

This application claim priority from Chinese Patent Application Number CN201611194069.8, filed on Dec. 21, 2016 at the State Intellectual Property Office, China, titled "METHOD AND APPARATUS FOR DATA ACCESS" the contents of which is herein incorporated by reference in its entirety.

FIELD

Embodiments of the present disclosure generally relate to the field of data storage, and more specifically, to method and apparatus for data access.

BACKGROUND

A multi-way tree (e.g. B-tree and its variations) is widely used in a file system or a database to organize data on a storage device (e.g. disk). A typical multi-way tree may consist of a root node, intermediate nodes and leaf nodes. Generally, an upper-level node may be used to store an address of a lower-level node (e.g., disk block number), and the leaf nodes may be used to store data for an actual application. To access a leaf node, an address of a next-level node can be searched sequentially from the root node, until the address of the leaf node to be accessed is found. Besides, to access a node in a storage device, the node needs to be read from the storage device to a memory firstly, and then accessed from the memory.

In order to access a node in the multi-way tree more quickly with considering a limited memory size, some of the nodes in the multi-way tree may be cached in the memory. Typically, least recently used (LRU) algorithm can be used to swap in/out a node to/from the memory. For example, an LRU linked list may be used to link the nodes in the memory, where a head of the linked list is the most recently accessed node and a tail of the linked list is the least recently used node. If usage of the memory exceeds a predetermined threshold, one or more cached nodes starting from the tail of the linked list may be swapped out of the memory to release the pressure on the memory.

SUMMARY

Embodiments of the present disclosure provide a method and an apparatus for data access.

In a first aspect of the present disclosure, a method of data access is provided. The method comprises determining whether target data stored in a non-volatile storage device is cached in a memory. The target data is organized in a first level of a multi-way tree in the storage device. The method further comprises, in response to determining that the target data is missing in the memory, moving the target data from the storage device into the memory. Besides, the method comprises, in response to the target data being accessed from the memory, adding a reference to the target data to a first list, the first list recording a sequence for accessing data in the first level.

In a second aspect of the present disclosure, an electronic device is provided. The device comprises at least one processing unit and at least one memory. The at least one memory is coupled to the at least one processing unit and stores instructions for execution by the at least one processing unit. The instructions, when executed by the at least one processing unit, cause the device to: determine whether target data stored in a non-volatile storage device is cached in a memory, the target data being organized in a first level of a multi-way tree in the storage device; in response to determining that the target data is missing in the memory, move the target data from the storage device into the memory; and in response to the target data being accessed from the memory, add a reference to the target data to a first list, the first list recording a sequence for accessing data in the first level.

In a third aspect of the present disclosure, a computer program product is provided. The computer program product is tangibly stored in a non-transient computer readable medium and comprises machine-executable instructions. The machine-executable instructions, when executed by a machine, cause the machine to perform any step of the method according to the first aspect of the present disclosure.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of example embodiments of the present disclosure will become more apparent from the following detailed description with reference to the accompanying drawings, in which the same reference symbols refer to the same elements.

Throughout the drawings, the same or corresponding reference symbols are used to indicate the same or corresponding parts.

DETAILED DESCRIPTION OF EMBODIMENTS

Preferred embodiments of the present disclosure will now be described in more detail with reference to the drawings; however, it should be appreciated that the present disclosure may be implemented in various manners but cannot be limited by the embodiments as described herein. On the contrary, these embodiments are provided to disclose the present disclosure more thoroughly and completely, and to convey the scope of the present disclosure exactly to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another one embodiment". The terms "first", "second", etc., may represent different or identical objects. Other explicit and implicit definitions may be included below.

As described above, in traditional solutions, a single LRU linked list is typically used to swap in/out a node to/from a memory. However, such LRU linked list does not take characteristics of the tree structure into consideration. For example, the leaf nodes are often placed in front of the LRU linked list as they are last access. Therefore, as compared with the leaf nodes, the root node and intermediate nodes which are more important for subsequent accesses will be swapped out of the memory earlier. In addition, each access to a node will cause a position change of the node in the LRU linked list. When the number of nodes is great or frequent accesses occur, operations on the single LRU linked list tend to become a bottle-neck of the system.

In order to solve one or more of the above problems and other potential problems, example embodiments of the present disclosure provide a solution for data access. With considering characteristics of the tree structure, this solution divides each LRU linked list into a plurality of linked lists of different priorities, each of which corresponds to a respective level of the tree structure. As such, nodes which are more important for subsequent accesses can be swapped out of the memory later. Besides, frequent operations on the LRU linked list can be avoided by deleting, from the LRU linked list, the node being accessed, thereby improving the system performance.

Figure 1:
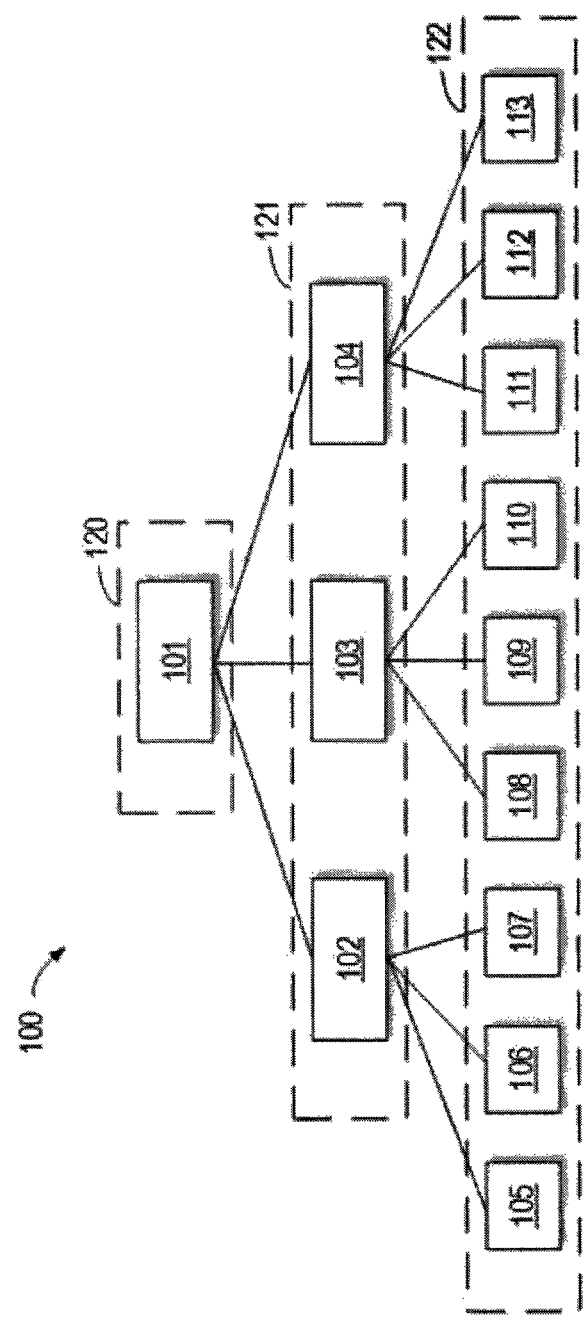
FIG. 1 illustrates an example structure of a typical multi-way tree 100 for organizing data on a storage device.

Principles and several example embodiments of the present disclosure will be described as below with reference to FIGS. 1 to 7. FIG. 1 illustrates an example structure of a typical multi-way tree 100 for organizing data on a storage device. It should be appreciated that the structure of the multi-way tree 100, as shown in FIG. 1, is only for the purpose of illustration, without suggesting any limitations to functionalities and scope of embodiments of the present disclosure.

For sake of description, a disk is taken as an example of a storage device in the following. However, this is only for the purpose of illustration. Any storage medium currently known or to be developed in the future based on other mechanisms may act as the storage device.

As shown in FIG. 1, the multi-way tree 100 (e.g., B+ tree) includes nodes 101-113. These nodes are organized in levels 120, 121 and 122 (i.e., a depth of the multi-way tree 100 is 3). Specifically, the level 120 includes a root node 101, the level 121 includes intermediate nodes 102-104, and the level 122 includes leaf nodes 105-113. Each of the nodes 101-113 may be used to store one or more key-value (KV for short) pairs. Typically, a value stored in a non-leaf node (i.e., any of the root node 101 and intermediate nodes 102-104), may be typically an address (e.g. disk block number) of a lower-level node. The values stored in the leaf nodes 105-113 may depend on an actual application.

For example, to access the leaf node 105, the root node 101 may be first accessed. That is, an address of a lower-level node (i.e., the intermediate node 102) may be searched based on an input key (e.g. an index of the leaf node 105) in the root node 101. Next, the intermediate node 102 may be accessed. That is, the address of the leaf node 105 is searched in the intermediate node 102. Finally, the leaf node 105 may be accessed based on the found address of the leaf node 105. Moreover, to access a node in the tree 100, the node needs to be read from the disk to a memory firstly, and then accessed from the memory.

It should be understood that the data stored in the nodes of the multi-way tree are not limited to the example forms as mentioned above. Embodiments of the present disclosure can be applied to any data organized in a tree structure. The scope of the present disclosure is not limited in this regard.

In order to access a node in the multi-way tree 100 more quickly with considering a limited memory size, some of the nodes in the multi-way tree 100 may be cached in the memory. If usage of the memory exceeds a predetermined threshold, some of the cached nodes may be swapped out of the memory to release the pressure on the memory. Embodiments of the present disclosure provide such a solution for data access.

Figure 2:
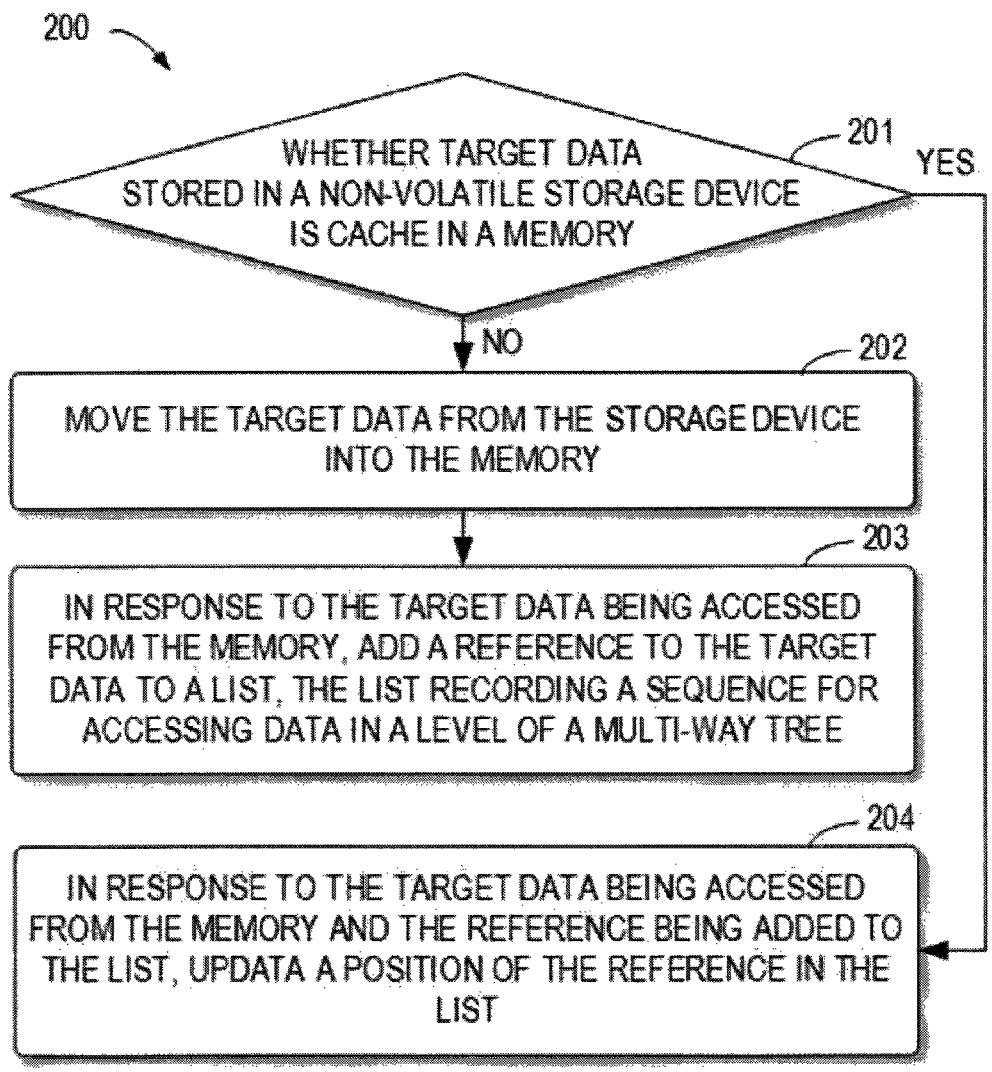
FIG. 2 illustrates a flowchart of a method 200 of data access according to embodiments of the present disclosure.

FIG. 2 illustrates a flowchart of a method 200 of data access according to embodiments of the present disclosure. Acts involved in the method 20 will be detailed described with reference to FIG. 1. It is to be understood that the method 200 may include additional acts not shown and/or may omit some acts as shown, and the scope of the present disclosure is not limited in this regard.

At block 201, it is determined whether target data stored in a non-volatile storage device is cached in a memory. For example, the target data may be organized in the node 102 of the level 121 of the multi-way tree 100. In some embodiments, whether the node 102 has been cached in the memory can be determined by searching a hash table. As an example, FIG. 3 illustrates a diagram of an example harsh table 300 for organizing nodes cached in a memory according to embodiments of the present disclosure.

Figure 3:
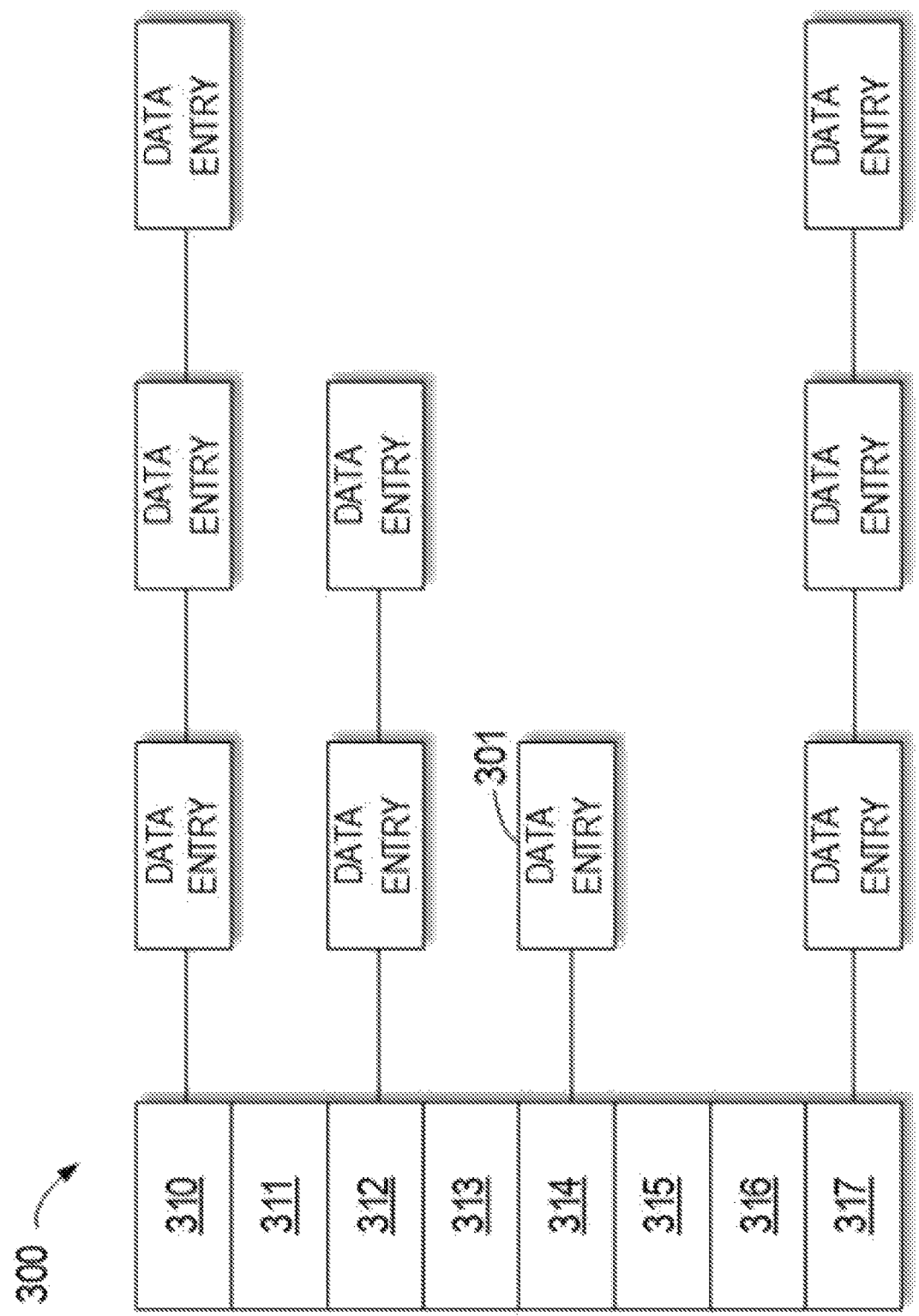
FIG. 3 illustrates a diagram of an example harsh table 300 for organizing nodes cached in a memory according to embodiments of the present disclosure.

As shown in FIG. 3, the hash table 300 is implemented in form of hash buckets where an sequential list may be employed to store head nodes (hereinafter also called "heads") of linked lists (hereinafter also called "buckets" or "hash links") comprised of data entries of identical hash values. As used herein, a data entry may indicate caching of a corresponding multi-way tree node in the memory. For example, the data entry may include a disk block number of the corresponding node, a pointer pointing to the cache of the corresponding node in the memory, a pointer pointing to a preceding data entry in the hash link, a pointer pointing to a subsequent data entry in the hash link, and so on. Detailed descriptions will be further provided with reference to FIG. 2.

For example, assuming that the disk block number of the root node 101 is 32, the hash length is 8, and the hash algorithm is a remainder method. Since 32% 8=4 (% represents a remainder operation), the search may be performed in the 4th hash link (i.e., the hash link 314). For example, if the data entry 310 in the hash link 314 can be found and the disk block number recorded by the data entry 301 is 32, it can be determined that the root node 101 has been cached in the memory. Assuming that the disk block number of the node 102 is 41, since 41% 8=1, the search may be performed in the hash link 311. Since the hash link 311 is empty, there is no any data entry therein, it thus can be determined that the node 102 is not cached in the memory.

It is to be understood that the hash bucket 300 as shown in FIG. 3 is only an example of an implementation of the hash table. Embodiments of the present disclosure may be applied to any hash table in another form currently known or to be developed in the future. The scope of the present disclosure is not limited in this regard.

Returning to FIG. 2, if it is determined at block 201 that the target data is missing in the memory, at block 202, the target data may be moved from the storage device into the memory. In some embodiments, a data entry (e.g. the data entry as described above with reference to FIG. 3) indicating that the node 102 is cached in the memory may be created. An address of a buffer for caching the node 102 and the disk block number of the node 102 may be saved in the data entry, and the data entry may be added to the hash table 300 as shown in FIG. 3.

At block 203, in response to the target data being accessed from the memory, a reference to the target data may be added to the list. In some embodiments, the list may be implemented as a linked list associated with one or more levels in the multi-way tree 100. For sake of description, an LRU linked list is taken as an example of the list in the following, and the LRU linked list may be only associated with one level of the multi-way tree 100. It is to be understood that this is for the purpose of illustration without suggesting any limitations to the scope of the present disclosure. The reference to the node 102 may be added to the LRU linked list which records an order for accessing the nodes in the level 121. For example, the reference to the node 102 can be inserted into the head of the LRU linked list. In some embodiments, the LRU linked list may be created (i.e., initialized) in response to creation of the level 121, and accordingly destroyed when all of the nodes in the level 121 are deleted (for example, from the storage device).

In addition, the data entry corresponding to the node 102, as described with reference to FIG. 3, may further include a first pointer pointing to a preceding data entry in the LRU linked list and a second pointer pointing to a subsequent data entry in the LRU linked list, in addition to the disk block number of the node 102, the pointer pointing to the cache of the node 102 in the memory, the pointer pointing to a preceding data entry in the hash link and the pointer pointing to a subsequent data entry in the hash link. The data entry corresponding to the node 102 can be added to the LRU linked list by modifying the first and second points.

If it is determined at block 201 that the target data have been cached in the memory, the method 200 proceeds to block 204. At block 204, in response to the target data being accessed from the memory and the reference to the target data being added to the list, the position of the reference in the list may be updated. In some embodiments, for example, the first pointer pointing to the preceding data entry in the LRU linked list and the second pointer pointing the subsequent data entry in the LRU linked list, in the data entry corresponding to the node 102 may be modified to move the data entry to the head of the LRU linked list, so as to indicate that the node 102 has been accessed recently.

Figure 4:
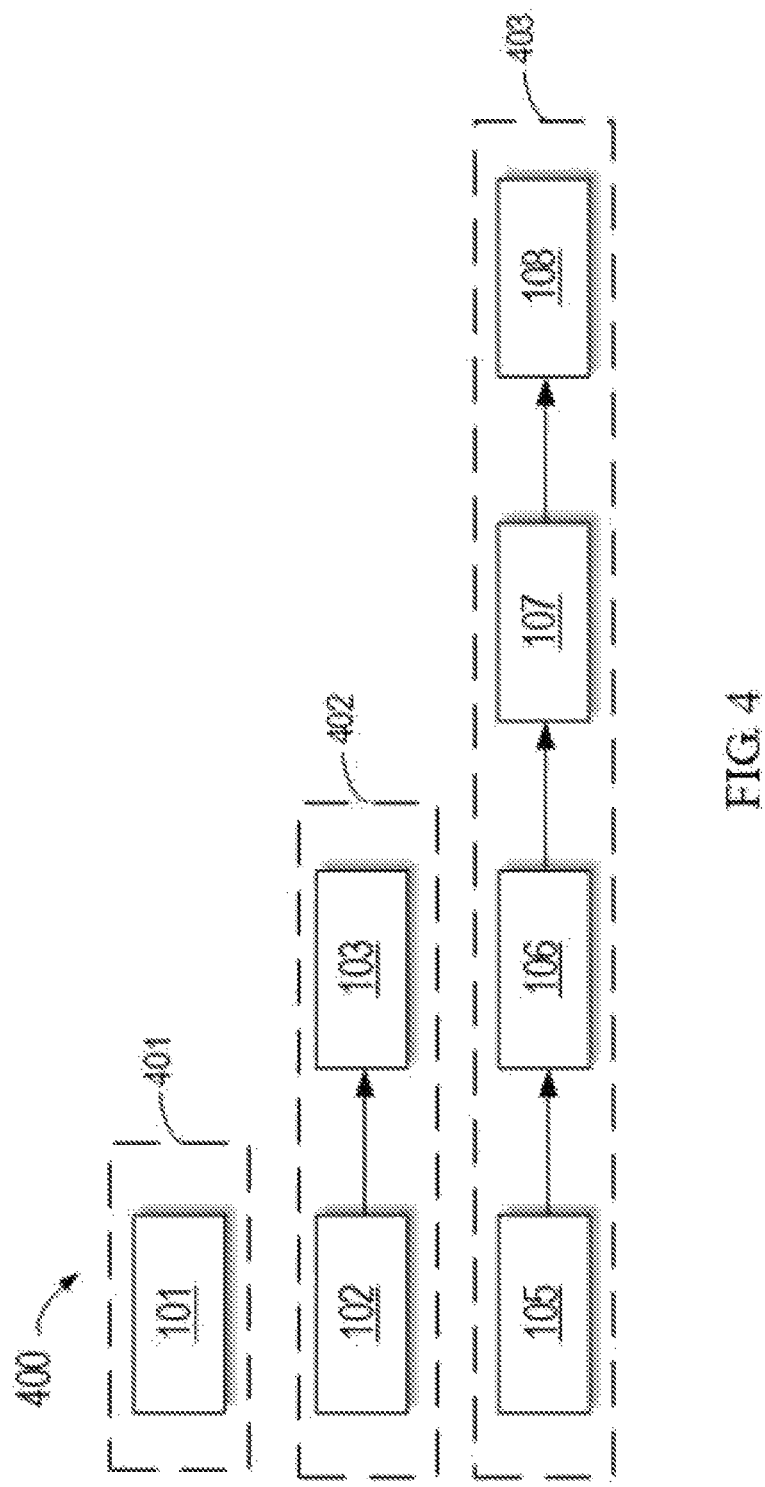
FIG. 4 illustrates a diagram of a plurality of lists associated with levels of the multi-way tree and provided for recording an access sequence of the nodes in the multi-way tree.

In this manner, an access sequence of respective nodes cached in the memory may be recorded in a plurality of lists associated with respective levels of the multi-way tree. FIG. 4 illustrates a diagram of the plurality of lists associated with respective levels of the multi-way tree and provided for recording an access sequence of the nodes in the multi-way tree. As shown in FIG. 4, the access sequence of the nodes in the level 120 is recorded in the list 401, the access sequence of the nodes in the level 121 is recorded in the list 402, and the access sequence of the nodes in the level 122 is recorded in the list 403. It is to be understood that the list as shown in FIG. 4 is only for the purpose of illustration without suggesting any limitations to the scope of the present disclosure.

Figure 5:
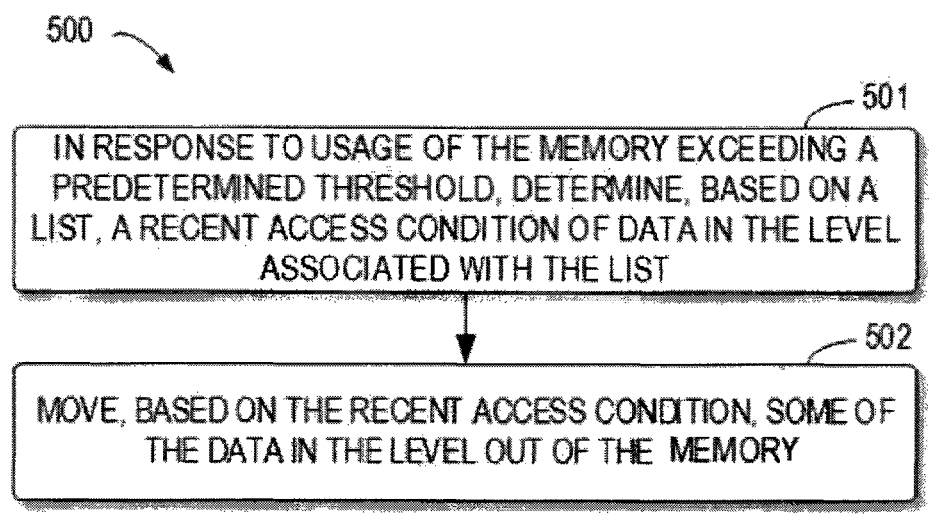
FIG. 5 illustrates a flowchart of a method 500 of moving a node of the multi-way tree out of the memory according to embodiments of the present disclosure.

If usage of the memory exceeds a predetermined threshold, some nodes may be swapped out of the memory based on the list to reduce the pressure on the memory. FIG. 5 illustrates a flowchart of a method 500 of moving a node of the multi-way tree out of the memory according to embodiments of the present disclosure. Acts involved in the method 500 will be detailed described with reference to FIG. 1. The method 500 may be performed in parallel with the method 200 or in succession with the method 200 (e.g. before or after the method 200). It should be appreciated that the method 500 may include additional acts not shown and/or may omit some acts as shown, and the scope of the present disclosure is not limited in this regard.

At block 501, in response to determining that the usage of the memory exceeds the predetermined threshold, a recent access condition of data in a level associated with a list is determined based on the list. For example, the recent access condition of the nodes in the level 121 may be determined based on the list 402.

At block 502, a part of the data in the level may be moved out of the memory based on the recent access condition. For example, when the list 402 is an LRU linked list, one or more nodes starting from the tail of the LRU linked list can be sequentially moved out of the memory until the usage of the memory drops below the predetermined threshold. That is, several least recently accessed nodes in the level 121 may be moved out of the memory.

In some embodiments, the method 500 may be performed sequentially for the linked lists associated with respective levels. For example, the method 500 may be performed firstly for the list 403 (i.e., leaf nodes), then for the list 402 (i.e., intermediate nodes), and finally for the list 401 (i.e., a root node). As such, a nodes which are more important for subsequent accesses will be moved out of the memory later. Particularly, the root node can be always cached in the memory (i.e., the method 500 are performed only for the lists 402 and 403), so as to improve the access efficiency.

In some embodiments, the method 500 may be performed in parallel for the linked lists associated with respective levels. For example, a first recent access condition of the data in the level 121 may be determined based on the list 402. Then, a first amount of data in the level 121 may be moved out of the memory based on the first recent access condition. Furthermore, a second recent access condition of data in the level 122 may be determined based on the list 403. Then, a second amount of data in the level 122 may be moved out of the memory based on the second access condition. Alternatively or in addition, different priorities can be set for the levels 121 and 122, respectively. For example, the priority of the level 121 can be set higher than that of the level 122, since the depth of the level 121 is less than that of the level 122. Accordingly, the data in the level 122 may be moved out of the memory in a greater proportion as compared with the level 121, i.e., the first amount may be less than the second amount. In some embodiments, an amount of data moved out of the memory in a higher level may be set to be 1/d of another amount of data moved out of the memory in a lower level, where d is an order of the multi-way tree (i.e., the maximum number of child nodes owned by a node in the tree). For example, assuming that the order of the multi-way tree 100 is 1024 and totally 2050 nodes needs to be moved out of the memory. In this event, 2 nodes can be moved out of the level 121, while 2048 nodes can be moved out of the level 122.

In some embodiments, if the usage of the memory exceeds a first threshold (e.g., a lower water line) but is lower than a second threshold (e.g., a high water line), the method 500 may be performed equentially (e.g. from the lower level to the higher level) for the linked lists associated with respective levels. When the usage of the memory exceeds the second threshold, the method 500 may be performed in parallel for the linked lists associated with respective levels.

It is to be understood that, some of the nodes may be moved out of the memory based on the lists according to another strategy instead of the above one. The scope of the present disclosure is not limited in this regard. In this manner, nodes which are more important for subsequent accesses can be moved out of the memory later, thereby improving the access efficiency.

As described above, each access to a node may cause a position change of the node in the corresponding LRU linked list. When the number of nodes of the multi-way tree is great or frequent accesses occur (e.g. a plurality of processes accesse the multi-way tree in parallel), this may lead to frequent operations on the LRU linked list, thereby reducing the system performance. In this regard, embodiments of the present disclosure may avoid frequent operations on the LRU linked lists by deleting, from the LRU linked list, the nodes being accessed.

Figure 6:
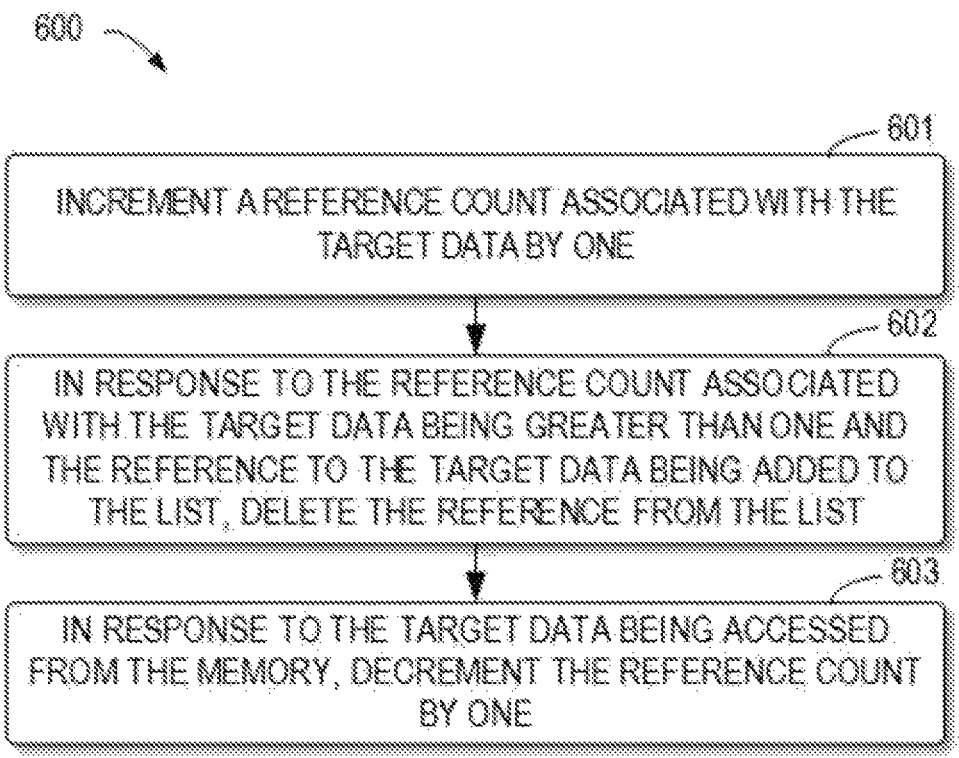
FIG. 6 illustrates a flowchart of a method 600 of data access according to embodiments of the present disclosure.

FIG. 6 illustrates a flowchart of a method 600 for data access according to embodiments of the present disclosure. In some embodiments, the method 600 may be performed as an additional act between blocks 202 and 203, and/or between blocks 201 and 204 in the method 200. It is to be understood that the method 600 may include additional acts not shown and/or may omit some acts as shown, and the scope of the present disclosure is not limited in this regard.

At block 601, a reference count associated with the target data (e.g. the node 102) may be incremented by one. The reference count may be used to indicate whether the target data is being accessed.

At block 602, in response to the reference count associated with the target data being greater than one and the reference to the target data having been added to the list (e.g. the list 402), the reference is deleted from the list. That is, when the target data are being accessed, it will be deleted from the list to avoid frequent operations on the list. It is to be understood that, if the method 600 is performed as an additional act between blocks 202 and 203 of the method 200, the block 602 may be omitted.

At block 603, in response to the target data being accessed from the memory, the reference count may be decremented by one.

In this manner, when a plurality of processes accesses the multi-way tree in parallel, frequent operations on the list can be avoided, thereby improving the access performance.

Figure 7:
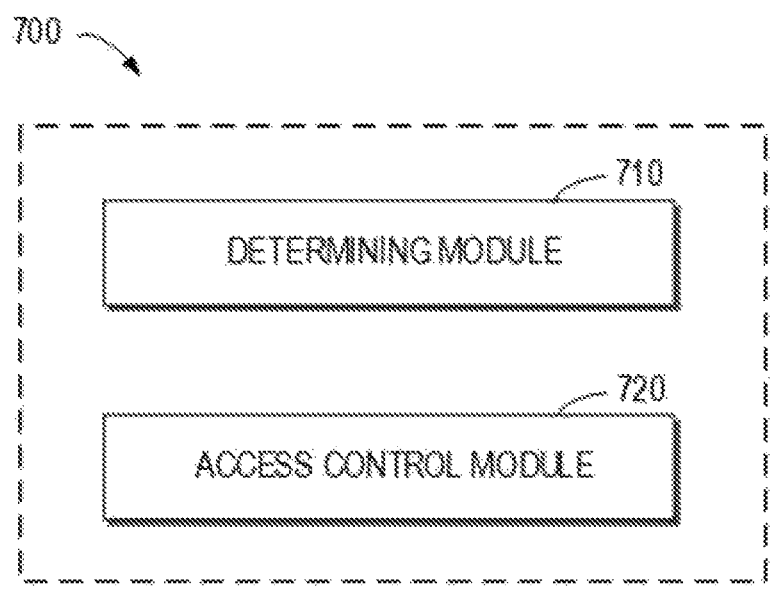
FIG. 7 illustrates a block diagram of an apparatus 700 for data access according to embodiments of the present disclosure.

FIG. 7 illustrates a block diagram of an apparatus 700 for data access according to embodiments of the present disclosure. As shown in FIG. 7, the device 700 may comprise a determination module 710 configured to determine whether target data stored in a non-volatile storage device is cached in a memory, the target data being organized in a first level of a multi-way tree in the storage device. The device 700 may further comprise an access control module 701 configured to, in response to determining that the target data is missing in the memory, move the target data from the storage device into the memory; and in response to the target data being accessed from the memory, add a reference to the target data to a first list, the first list recording a sequence for accessing data in the first level.

For the sake of clarity, FIG. 7 does not show some optional modules of the apparatus 700. However, it should be understood that respective features described above with reference to FIGS. 1-6 are also suitable for the apparatus 700. Moreover, respective modules in the apparatus 700 may be hardware modules or software modules. For example, in some embodiments, the apparatus 700 may be implemented partially or fully with software and/or firmware, e.g., implemented as a computer program product embodied on a computer readable medium. Alternatively or additionally, the apparatus 700 may be implemented partially or fully based on hardware, e.g., implemented as an integrated circuit (IC), an application-specific integrated circuit (ASIC), a system on chip (SOC), a field programmable gate array (FPGA), etc. The scope of the present disclosure is not limited in this aspect.

Figure 8:
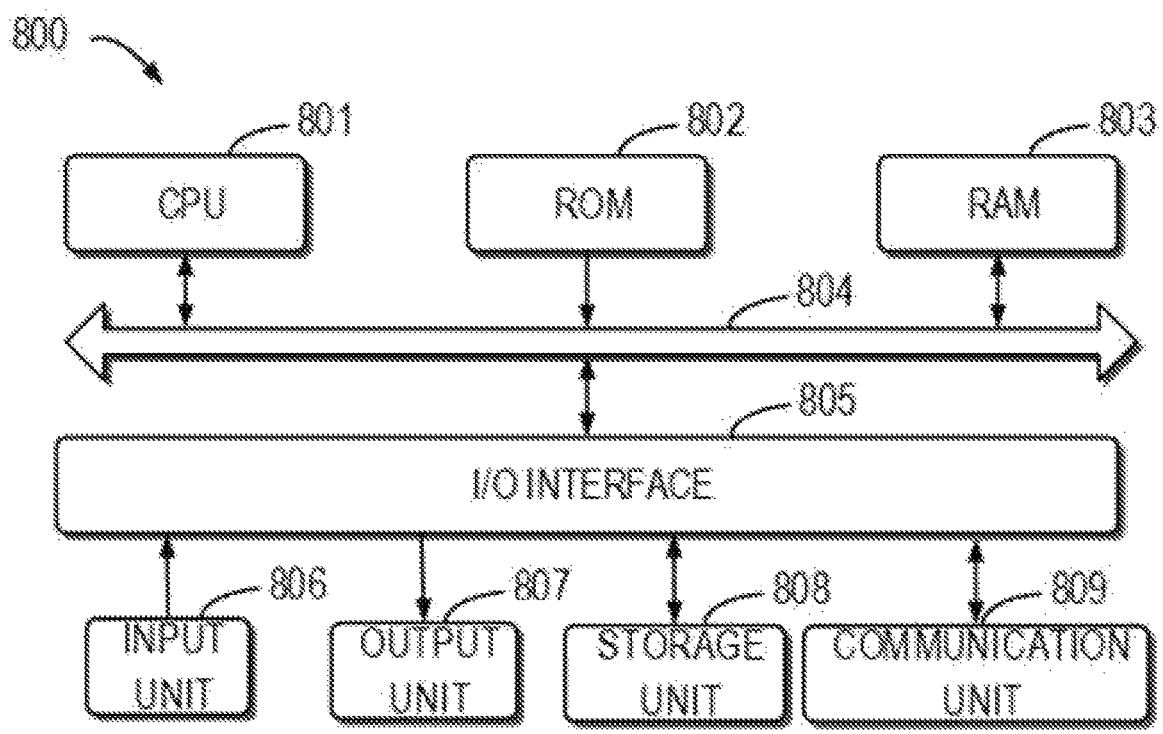
FIG. 8 illustrates a block diagram of a computer system 800 adapted to implement example embodiments of the present disclosure.

FIG. 8 illustrates a block diagram of an example apparatus 800 adapted to implement embodiments of the present disclosure. As shown in FIG. 8, the apparatus 800 comprises a central processing unit (CPU) 801 that may perform various appropriate acts and processing based on computer program instructions stored in a read-only memory (ROM) 802 or computer program instructions loaded from a storage section 808 to a random access memory (RAM) 803. In the RAM 803, there further store various programs and data needed for operations of the apparatus 800. The CPU 801, ROM 802 and RAM 803 are connected to each other via a bus 804. An input/output (I/O) interface 805 is also connected to the bus 804.

Multiple components in the apparatus 800 are connected to the I/O interface 805: an input unit 806 such as a keyboard, a mouse and the like; an output unit 807 including various kinds of displays and a loudspeaker, etc.; a storage unit 808 including a magnetic disk, an optical disk, and etc.; a communication unit 809 including a network card, a modem, and a wireless communication transceiver, etc. The communication unit 809 allows the apparatus 800 to exchange information/data with other apparatuses through a computer network such as the Internet and/or various kinds of telecommunications networks.

Various processes and processing described above, e.g., the method 200, 500 and/or 600, may be executed by the processing unit 801. For example, in some embodiments, the method 200, 500 and/or 600 may be implemented as a computer software program that is tangibly embodied on a machine readable medium, e.g., the storage unit 808. In some embodiments, part or all of the computer programs may be loaded and/or mounted onto the apparatus 800 via ROM 802 and/or communication unit 809. When the computer program is loaded to the RAM 803 and executed by the CPU 801, one or more steps of the method 200, 500 and/or 600 as described above may be executed.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:
1. A method for data access, comprising:
   determining whether target data stored in a non-volatile storage device is cached in a memory, the target data being organized in a first level of a multi-way tree in the storage device;

in response to determining that the target data is missing in the memory, moving the target data from the storage device into the memory; and in response to the target data being accessed from the memory, adding a reference to the target data to a first list, the first list recording a sequence for accessing data in the first level, wherein the multi-way tree has a second level having a lower priority than the first level, and wherein the method further comprises moving data out of the memory in inverse relation to priority, such that a greater proportion of data organized in the second level of the multi-way tree is moved out of memory than is moved out of memory from the first level of the multi-way tree.

2. The method according to claim 1, wherein the determining whether target data stored in a non-volatile storage device is cached in a memory comprises:

determining, by searching a hash table, whether the target data is cached in the memory; and wherein the moving the target data from the storage device into the memory comprises:

adding, to the hash table, a data entry indicating that the target data is cached in the memory.

3. The method according to claim 1, further comprising:

in response to determining that the target data has been cached in the memory, causing the target data to be accessed from the memory; and in response to the target data being accessed from the memory and the reference being added to the first list, updating a position of the reference in the first list.

4. The method according to claim 1, further comprising:

in response to determining that usage of the memory exceeds a predetermined threshold, determining, based on the first list, a recent access condition of data in the first level; and moving, based on the recent access condition, a part of the data in the first level out of the memory.

5. The method according to claim 1, further comprising:

in response to determining usage of the memory exceeds a predetermined threshold, determining, based on the first list, a first recent access condition of data in the first level;

moving, based on the first recent access condition, a first amount of data in the first level out of the memory;

determining, based on a second list, a second recent access condition of data in the second level of the multi-way tree, and the second list recording a sequence for accessing the data in the second level; and moving, based on the second access condition, a second amount of data in the second level out of the memory, the first amount being less than the second amount.

6. The method according to claim 5, wherein a depth of the second level in the multi-way tree is greater than that of the first level in the multi-way tree.

7. The method according to claim 1, further comprising:

in response to determining that the target data is being accessed and the reference has been added to the first list, removing the reference from the first list.

8. The method of claim 1, further comprising accessing the target data in the multi-way tree by searching at least one address of one or more nodes of the multi-way tree.

9. The method of claim 1, wherein the first level of the multi-way tree comprises a root node, and further comprising accessing the target data in the multi-way tree by searching from the root node.

10. An electronic device, comprising:

at least one processing unit;

at least one memory coupled to the at least one processing unit and storing instructions for execution by the at least one processing unit, the instructions, when executed by the at least one processing unit, causing the device to:

determine whether target data stored in a non-volatile storage device is cached in a memory, the target data being organized in a first level of a multi-way tree in the storage device;

in response to determining that the target data is missing in the memory, move the target data from the storage device into the memory; and in response to the target data being accessed from the memory, add a reference to the target data to a first list, the first list recording a sequence for accessing data in the first level, wherein the multi-way tree has a second level having a lower priority than the first level, and wherein the instructions further cause the device to move data out of the memory in inverse relation to priority, such that a greater proportion of data organized in the second level of the multi-way tree is moved out of memory than is moved out of memory from the first level of the multi-way tree.

11. The device according to claim 10, wherein the determining whether target data stored in a non-volatile storage device is cached in a memory comprises:

determining, by searching a hash table, whether the target data is cached in the memory; and wherein the moving the target data from the storage device into the memory comprises:

adding, to the hash table, a data entry indicating that the target data is cached in the memory.

12. The device according to claim 10, wherein the instructions, when executed by the at least one processing unit, further cause the device to:

in response to determining that the target data has been cached in the memory, cause the target data to be accessed from the memory; and in response to the target data being accessed from the memory and the reference being added to the first list, update a position of the reference in the first list.

13. The device according to claim 10, wherein the instructions, when executed by the at least one processing unit, further cause the device to:

in response to determining that usage of the memory exceeds a predetermined threshold, determine, based on the first list, a recent access condition of data in the first level; and move, based on the recent access condition, a part of the data in the first level out of the memory.

14. The device according to claim 10, wherein the instructions, when executed by the at least one processing unit, further cause the device to:

in response to determining usage of the memory exceeds a predetermined threshold, determine, based on the first list, a first recent access condition of data in the first level;

move, based on the first recent access condition, a first amount of data in the first level out of the memory;

determine, based on a second list, a second recent access condition of data in the second level of the multi-way tree, and the second list recording a sequence for accessing the data in the second level; and move, based on the second access condition, a second amount of data in the second level out of the memory, the first amount being less than the second amount.

15. The device according to claim 14, wherein a depth of the second level in the multi-way tree is greater than that of the first level in the multi-way tree.

16. The device according to claim 10, wherein the instructions, when executed by the at least one processing unit, further cause the device to:

in response to determining that the target data is being accessed and the reference has been added to the first list, remove the reference from the first list.

17. A computer program product for data access, the computer program product comprising:

a non-transitory computer readable medium encoded with computer-executable program code, the code configured to enable the execution of:

determining whether target data stored in a non-volatile storage device is cached in a memory, the target data being organized in a first level of a multi-way tree in the storage device;

in response to determining that the target data is missing in the memory, moving the target data from the storage device into the memory; and in response to the target data being accessed from the memory, adding a reference to the target data to a first list, the first list recording a sequence for accessing data in the first level, wherein the multi-way tree has a second level having a lower priority than the first level, and wherein the method further comprises moving data out of the memory in inverse relation to priority, such that a greater proportion of data organized in the second level of the multi-way tree is moved out of memory than is moved out of memory from the first level of the multi-way tree.

18. The computer program product of claim 17, wherein the determining whether target data stored in a non-volatile storage device is cached in a memory comprises:

determining, by searching a hash table, whether the target data is cached in the memory; and wherein the moving the target data from the storage device into the memory comprises:

adding, to the hash table, a data entry indicating that the target data is cached in the memory.

19. The computer program product of claim 17, wherein the code is further configured to enable the execution of:

in response to determining that the target data has been cached in the memory, causing the target data to be accessed from the memory; and in response to the target data being accessed from the memory and the reference being added to the first list, updating a position of the reference in the first list.

20. The computer program product of claim 17, wherein the code is further configured to enable the execution of:

in response to determining that usage of the memory exceeds a predetermined threshold, determining, based on the first list, a recent access condition of data in the first level; and moving, based on the recent access condition, a part of the data in the first level out of the memory.

21. The computer program product of claim 17, wherein the code is further configured to enable the execution of:

in response to determining usage of the memory exceeds a predetermined threshold, determining, based on the first list, a first recent access condition of data in the first level;

moving, based on the first recent access condition, a first amount of data in the first level out of the memory;

determining, based on a second list, a second recent access condition of data in the second level of the multi-way tree, and the second list recording a sequence for accessing the data in the second level; and moving, based on the second access condition, a second amount of data in the second level out of the memory, the first amount being less than the second amount.

22. The computer program product of claim 21, wherein a depth of the second level in the multi-way tree is greater than that of the first level in the multi-way tree.

* * * * *